Dec. 30, 1952  H. F. HOBBS ET AL  2,623,412
VARIABLE-RATIO POWER TRANSMISSION APPARATUS
Filed May 15, 1951  3 Sheets-Sheet 1

Inventors.
H. F. HOBBS AND K. THORNTON
By Young, Emery & Thompson
Attorneys.

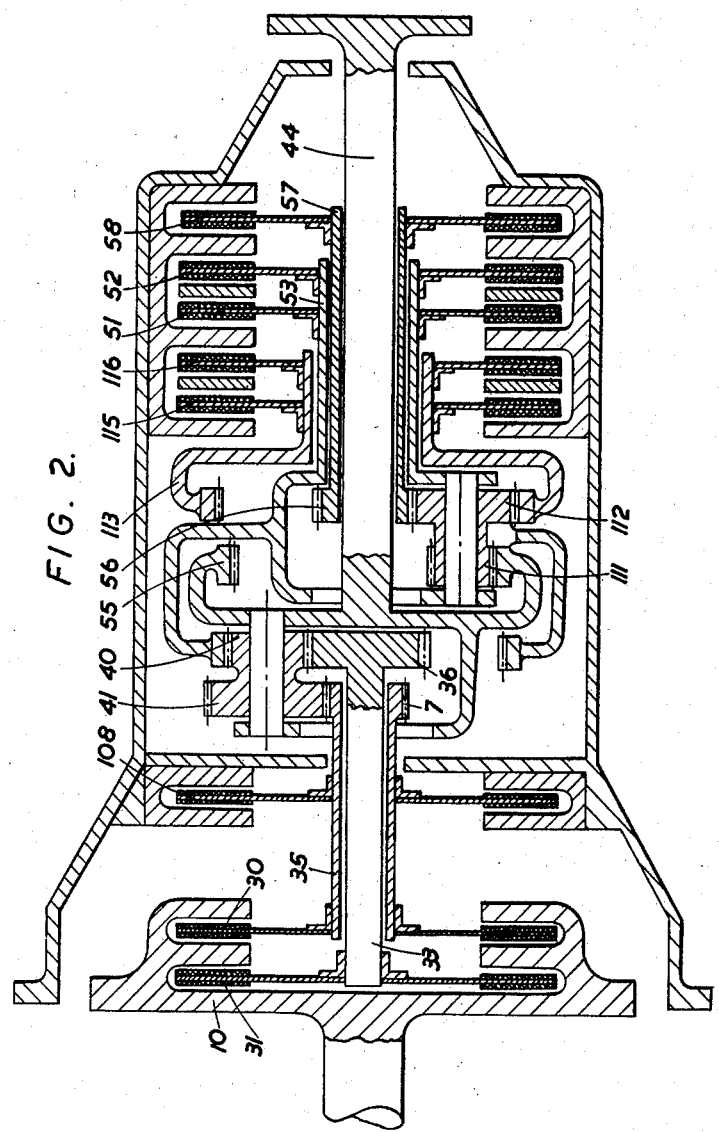

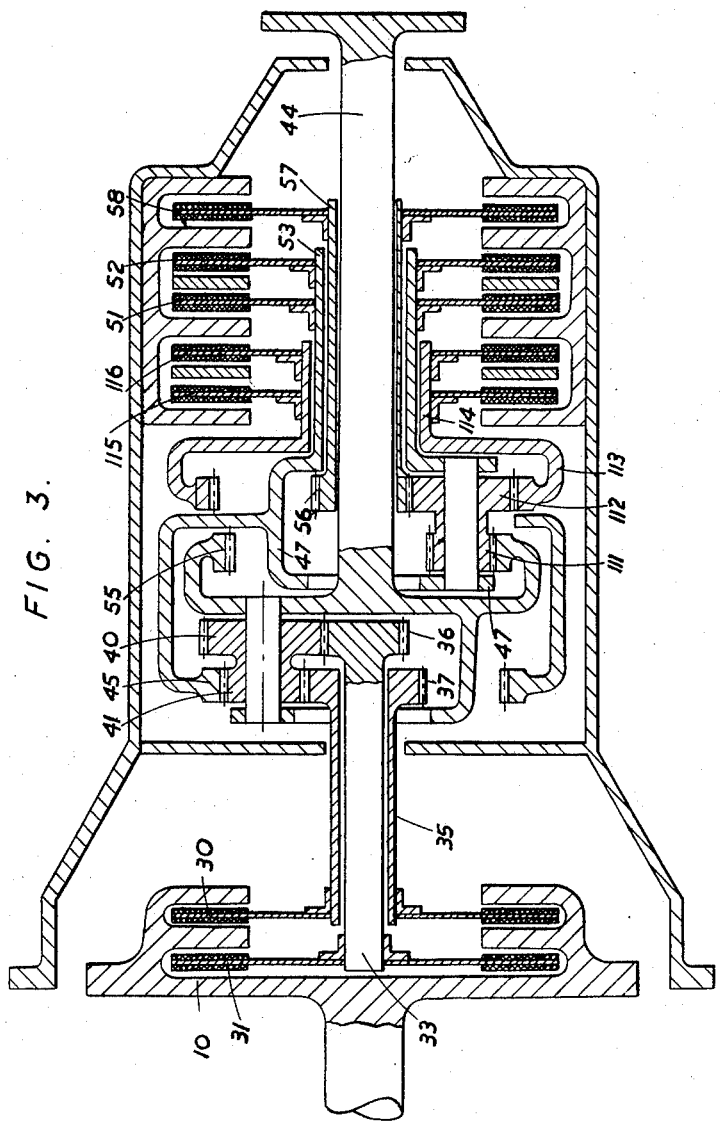

Patented Dec. 30, 1952

UNITED STATES PATENT OFFICE

2,623,412

VARIABLE-RATIO POWER TRANSMISSION APPARATUS

Howard F. Hobbs and Kenneth Thornton, Leamington Spa, England, assignors to Hobbs Transmission Limited, Leamington Spa, England, a British company Application May 15, 1951, Serial No. 226,468
In Great Britain May 16, 1950

5 Claims. (Cl. 74—759)

This invention relates to variable-ratio power transmission apparatus of the kind comprising a number of friction engaging devices associated with gearing whereby different ratios can be obtained by selective engagement of the friction devices.

Apparatus of this kind is well known and usually comprises gear trains associated with friction devices constituted by band brakes and clutches whereby certain parts of the gear can be driven or held stationary in such a manner as to provide a number of torque/speed ratios.

For use in some types of heavy vehicles it is desirable to provide a fairly large number of ratios, e. g. five or six for forward operation and one or two for reverse, it being necessary that the forward ratios cover a comparatively wide speed range and preferably that the lowest of the reverse ratios provides a speed which is about mid-way in the forward range. Owing to the wide range relatively high loads are introduced which necessitates the use of comparatively large gears. In some applications the range of input speeds may be fairly wide. These requirements introduce considerable difficulty.

The object of the present invention is to provide an arrangement of gearing which will give the required number and range of ratios with the minimum of complications, weight and bulk, and which will enable the speeds and loads to be transmitted by the gearing to be reduced to a minimum.

It is desirable in apparatus of the kind referred to that some of the friction devices act as input clutches and are used for starting and stopping, thereby obviating the necessity for a separate main clutch. Furthermore, the parts of the input clutches may form part of the rotary engine flywheel with saving in weight. It is also desirable that the remaining friction devices form reaction brakes so that they can be mounted directly in the stationary casing whereby saving bulk and complication.

In apparatus of this kind already proposed intermediate clutches are sometimes employed and these necessitate additional rotary housings and feed members which add to the size and complication of the unit.

The present invention utilises only input and reaction friction devices and a further advantage is obtained owing to the fact that each of the devices is associated with considerable mass, i. e., the clutches with the engine flywheel and the brakes with the gear housing and the engine to which the housing is fixed. This results in improved operation since the mass tends to assist in obtaining smooth take up without snatch or sudden change in speed.

According to the invention, the apparatus comprises an input part, two intermediate shafts, an output shaft, a fixed casing, two input clutches, at least two reaction brakes, a primary gearing and a secondary gearing, each said gearing having driving, driven and reaction elements, said intermediate shafts each being engageable with said input part by means of the clutches, and each carrying a driving element of the primary gearing, said output shaft carrying a driven element of the primary gearing and a driving element of the secondary gearing, a reaction element of the primary gearing and a driven element of the secondary gearing being connected together and carrying part of one of said brakes and being thereby engageable with the fixed casing, the other of said brakes having part thereof carried by a reaction element of the secondary gearing and being thereby engageable with the fixed casing, whereby the output shaft can be driven at different speeds by engagement of the different clutches and brakes and whereby when one or the other of the clutches engage the input part, and the said other brake the fixed casing, the said reaction element of the primary gearing is driven from the output shaft against the reaction load exerted by the primary gearing.

The invention provides a simple unit giving at least five speeds forward in which case four friction devices only are employed, various combinations of which give all the forward speeds.

The friction devices are preferably of the kind which are actuated hydraulically. The friction surfaces of the clutch will preferably be lubricated, but one or more of the brakes may be sealed from the oil so as to remain dry and thereby provide a correspondingly greater torque capacity. Each device may comprise a single spinner plate, a pressure plate, an insulator plate, and a rubber faced diaphragm forming the one side of a pressure actuating space, the diaphragm being clamped at its inner and outer edges whereby the space is sealed. Liquid pressure is fed to the space to cause engagement of the friction surfaces. The actuating spaces of the clutches which are formed in the rotary housing comprise part of the engine flywheel and centrifugal force acting on the liquid within the spaces and the ducts leading to the spaces will exert a substantial part of the engaging load.

Spring urged pressure operated exhausting valves may be carried in the rotary part whereby the spaces can be emptied when it is desired to free the clutches. The rotary housing may also carry centrifugally operating valves for the purpose of automatically engaging and disengaging the clutches at and below some predetermined speed. These may be constructed, according to the inventions described in the specifications of British patent applications Nos. 6,143 of 1947, 4,293 of 1948, and 16,369 of 1947.

In order that the invention may be readily understood three constructional forms thereof will now be described by way of example as suitable for variable speed power transmission apparatus for vehicles. These three forms are illustrated in the accompanying diagrammatic drawings wherein:

Figures 2 and 3 are similar views of more schematic nature showing two modified constructions.

Figure 1:
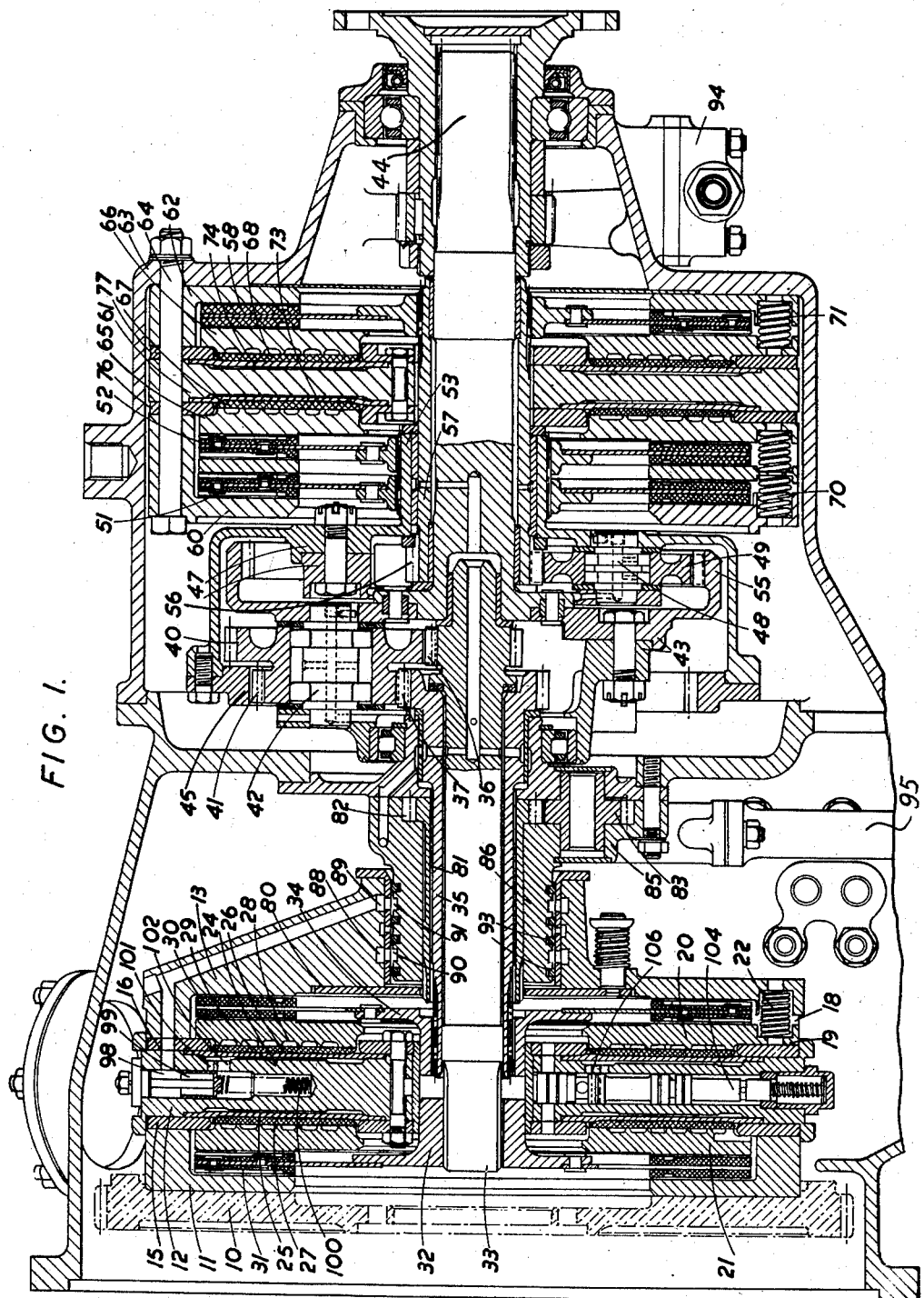
Figure 1 is a sectional view of an apparatus made in accordance with the invention.

Referring first to Figure 1: An engine flywheel 10, carries a front plate 11, a centre plate 12 hereinafter referred to as the valve body, and a back plate 13, and these three plates are bolted together to form a rotary housing carrying the parts of two clutches, the bolts not being shown in the drawing. Metal rings 15, 16, are clamped between the parts 11, 12, and 12, 13, respectively. The front and back plates 11, 13 are slotted at 18 near the periphery to carry tongues 9, formed on pressure plates 20, 21, and also having pockets to hold springs 22 which tend to urge the pressure plates towards the valve body. Synthetic rubber faced diaphragms 24, 25, are clamped one to each side of the valve body 12 by means of the clamping rings 15, 16, and between each diaphragm and its associated pressure plate there is an insulator plate 26, 27. The surfaces of the pressure plates which contact the insulator plates are provided with a number of grooves 28 which reduce the area of contact and also provide a path for circulating oil. The diaphragms cover annular recesses 29 and so form oil pressure actuating spaces on each side of the valve body so that when oil under pressure is led to the spaces the diaphragms move away from the valve body, thereby causing engagement of the rotary housing with the driven parts of the clutches which comprise spinner plates 30, 31, carrying facings of asbestos material engageable with the pressure plates and the front and back plates. The spinner plate 31 engaging the front plate is riveted to a hub 32 carried by an inner intermediate shaft 33 and the spinner plate 30 engaging the back plate is riveted to a hub 34 carried by a second intermediate shaft 35 in the form of a sleeve surrounding the first or inner intermediate shaft 33. The intermediate shafts 33, 35, have sun gears 36, 37, formed thereon at their rear ends. The sun gear on the sleeve 35 is of larger diameter than the sun gear on the inner intermediate shaft 33, and the sun gears engage a set of double planet pinions 40, 41, carried on spindles 42, mounted in a cage 43 each double pinion consisting of two integral pinions of different sizes. The cage is carried by an output shaft 44. The smaller of each of the double pinions also meshes with an outer ring gear 45. This outer ring gear forms parts of a cage 47 for a second gear train which carries spindles 48 on which single planet gears 49 are mounted. Spinner plates 51, 52, of a brake have their hubs splined on a sleeve 53 formed integrally with the outer ring gear 45 and cage 47. The single pinions 49, forming part of the second gear train mesh with a second or inner ring gear 55 forming part of the cage of the first gear train and also with a sun gear 56, carried by a sleeve 57, surrounding the output shaft 44. This sleeve carries the spinner plate 58 of a second brake. The two brakes are constructed in a similar way to the clutches, there being front, centre and back plates 60, 61, 62, which bolt within the stationary housing 63 of the apparatus by bolts 64 and which carry the pressure plates 65, 66, insulator plates 67, 68, push off springs 70, 71, diaphragms 73, 74, and clamping rings 76, 77.

The back plate 13 of the rotary clutch housing carries a plate 80 which engages a sleeve 81 which surrounds the outer intermediate shaft 35 on which is formed the driving gear 82 of a gear pump. An idler gear 83 meshes with the driving gear to form the input driven pump of the apparatus. The pump body 85 carries suitable control means for directing the delivery of the pump to the various clutches and brakes and is of no import in the instant application. The pump body also forms a feed journal 86 which mates with a central bore in the back plate 13 of the rotary housing. This plate is provided with two sets of ducts 88, 89, leading to the two clutches and each of these mate with grooves 90, 91 in the feed journal, the grooves being connected to the control means by suitable ducts (not shown) in the journal 86. Expanding oil seal rings 93 operate in grooves between the oil feed grooves so as to prevent excessive leakage.

An additional oil pump 94 is driven from the output shaft of the apparatus. Both pumps have suction pipes (one of which is shown at 95) leading to a sump formed at the bottom of the housing and have a common delivery means. The purpose of the output driven pump is to supply oil under pressure for engaging the clutches and brakes should the input part be stationary, for example, when it is necessary to start the engine by towing the vehicle. All of the above hydraulic control means do not form a part of the present invention. Each set of ducts in the back plate 13 leads to a radial bore (one of which is shown at 98) in the clutch body 12. A piston valve (one being shown at 99) operates in each bore and is urged outwards by a spring 100. When pressure is opened to a set of ducts and to the outer end of the associated bore 98, the valve is moved inwards against its spring 100, so as to uncover a port 101, leading to the oil pressure actuating space 29. When the pressure is closed to the ducts the spring causes the valve to move outwards in which position it uncovers an exhaust 102 and allows oil in the actuating space 29 to exhaust through an exhaust port as shown at 83 in Patent No. 2,571,448 into the stationary housing of the apparatus. The mass of each valve and spring is such that the centrifugal force thereon is equal to the centrifugal pressure exerted by the liquid in the bore and ducts. The valve is therefore balanced against centrifugal action. The clutch body 12 also carries two additional radial bores having spring urged piston valves, one of which is shown at 104. When the engine is idling, the valves take up a position in which additional exhausts 106 from the oil actuating spaces are opened thereby relieving the pressure (as more fully described in co-pending patent application No. 30,556 filed June 2, 1948) in the spaces and causing the clutches to be disengaged. An increase in engine speed causes the valves to move outwards under the action of centrifugal force and against the springs thereby closing the exhausts and causing the clutches to be automatically engaged. When the engine is stationary the springs move the valves to their innermost position in which position the exhausts are closed so that the clutches may be engaged by oil pressure delivered from the output driven pump.

The five forward ratios are obtained in the following manner:

*First.*—Oil pressure is opened to the brake 51, 52, carried by the ring gear 45 and also to the front clutch 31. The inner intermediate shaft 33 is therefore driven causing its sun-wheel 36 to rotate the double pinions 40, 41, and therefore the cage 43 and output shaft 44 at a relatively low speed.

*Second.*—The front clutch 31 is disengaged and the back clutch 30 engaged (i. e. engaging the back plate). The outer intermediate shaft 35 is driven causing its sun-wheel 37 to be driven and the cage 43 and output shaft 44 to be rotated at increased speed since this sun-wheel is of greater size than the sun-wheel 36.

*Third.*—The brake 51, 52 is disengaged and the brake 58 engaged. The front clutch 31 is engaged and back clutch 30 disengaged causing the inner intermediate shaft 33 to transmit the drive. Upon rotation of the shaft 33 rotation of the output shaft 44 will be driven through the parts 36, 40, 42, 43, and will cause the ring gear 45 to rotate forwards through parts 56, 49, 47, the ratio will be decreased and the cage 43 will be driven at increased speed.

*Fourth.*—The back clutch 30 is engaged and front clutch 31 disengaged which provides a still further increased speed.

*Fifth.*—Both the clutches 30, 31 are engaged and both the brakes 51, 52 and 58 disengaged. This causes the gear trains to rotate "solid" and the ratio will be direct or 1 : 1.

*Neutral.*—For neutral condition the control valve is selected so as to allow both clutches 30, 31 and brakes 51, 52 and 58 to be disengaged.

As shown in Figure 2, an additional spinner plate 108 of a brake may be carried by the outer intermediate shaft in which case the outer shaft 35 will carry the smallest sun-wheel. The other parts of the brake will be mounted in the housing. If the brake 108 is engaged and also the front clutch 31, the double pinions 41, 40 will be caused to planetate forwards thereby carrying the cage and the output shaft 44 at an increased speed. This additional brake therefore provides a sixth speed which is an overdrive. In this figure there is also shown a pair of additional brakes 115, 116, more particularly described with reference to Figure 3.

Figure 3 shows means whereby reverse ratios are obtained. The single planet pinions 49 in Fig. 1 of the second gear train may be replaced by double planet pinions 111, 112 similar to those of the first gear train. The pinions 111 mesh with the second or inner ring gear 55 and the pinions 112 mesh with an additional ring gear 113. This ring gear has a hub or sleeve 114 on which is mounted the spinner plates 115, 116, of an additional brake. The pinions 112 mesh with the sun gear 56 carried by the sleeve 57.

With this arrangement the forward speeds are obtained as described above, but by engagement of the additional brake 115, 116, two reverse speeds (or two forward speeds according to gearing sizes) are obtained by engaging one or other of the clutches 30, 31. The highest ratio will be obtained by engaging the clutch plate 31, and the brake 115/116. Engagement of the brake holds the reaction member 113 stationary. Torque applied to the gear 36, through the pinions 40, to the ring gear 45 causes the ring gear 45 to rotate backwards carrying with it the pinions 111/112, which due to engagement with the ring gear 113 cause the gear 55 to rotate backwards, thereby resulting in reverse drive to the output shaft 44. If the brake 115/116 is engaged, and the clutch 30 engaged, the output shaft will be driven at increased speed since the gear 37 is larger than the gear 36, thereby providing two reverse speeds. Should the gear 111 be made larger than the gear 112, two additional forward speeds will be obtained.

It will be observed that in all three constructions illustrated there is a primary gearing consisting of driving elements 36, 37, a driven element 43, and a reaction element 45; and secondary gearing consisting of a driving element 55, a driven element 47 (connected to the element 45 and carrying parts of the brakes 51, 52) and a reaction element 56 carrying part of the brake 58. This construction in combination with the clutches and brakes and intermediate shafts provides the required ratios in a simple and effective manner.

We claim:

1. Variable ratio power transmission apparatus comprising an input part, two intermediate shafts, an output shaft, a fixed casing, two input clutches, at least two reaction brakes, a primary gearing and a secondary gearing, each said gearing having driving, driven and reaction elements, said intermediate shafts each being engageable with said input part by means of the clutches, and each carrying a driving element of the primary gearing, said output shaft carrying a driven element of the primary gearing and a driving element of the secondary gearing, a reaction element of the primary gearing and a driven element of the secondary gearing being connected together and carrying part of one of said brakes and being thereby engageable with the fixed casing, the other of said brakes having part thereof carried by a reaction element of the secondary gearing and being thereby engageable with the fixed casing, whereby the output shaft can be driven at different speeds by engagement of the different clutches and brakes and whereby when one or the other of the clutches engage the input part, and the said other brake engages the fixed casing, the said reaction element of the primary gearing is rotated forward by the driven element of the secondary element.

2. A variable ratio power transmission apparatus as claimed in claim 1 wherein one of the intermediate shafts surrounds the other, the driving elements of the primary gearing consist of toothed sun-wheels carried by the intermediate shafts, the driven element of the primary gearing consists of a cage, the reaction element of the primary gearing is a primary ring gear, the driving element of the secondary gearing is a secondary ring gear connected to said cage; and having spindles mounted in said cage, primary double pinions mounted on said spindles and meshing with said sun-wheels, one of each said double pinions meshing with said primary ring gear, secondary pinions carried by the driven element of the secondary gearing and meshing with said secondary ring gear, and a reaction sun-wheel constituting part of the reaction element of the secondary gearing and meshing with said secondary pinions.

3. Variable ratio power transmission apparatus as claimed in claim 1 having an additional brake, and an additional reaction element of the secondary gearing, part of said additional brake being carried by said additional reaction element of the secondary gearing whereby the reaction element of the primary gearing can be driven at different speeds by selective operation of said reaction brakes.

4. A variable ratio power transmission apparatus as claimed in claim 2 having an additional brake, an additional reaction element of the secondary gearing, and a third ring gear carried by the additional brake, part of said additional brake being carried by said additional reaction element of the secondary gearing whereby the reaction element of the primary gearing can be driven at different speeds by selective operation of said reaction brakes, said secondary pinions being double pinions, one set of which mesh with the secondary ring gear while the other set meshes with said third ring gear and with said reaction sun-wheel.

5. Variable ration power transmission apparatus as claimed in claim 1 having an additional brake, part of which is carried by an element of the primary gearing, whereby an additional speed ratio can be obtained when said brake is applied.

HOWARD F. HOBBS.
KENNETH THORNTON.

REFERENCES CITED

The following references are of record in the file of this patent:

UNITED STATES PATENTS

| Number | Name | Date |
|---|---|---|
| 1,256,371 | Rowledge | Feb. 12, 1918 |
| 1,256,373 | Rowledge | Feb. 12, 1918 |
| 2,395,459 | Carnagua | Feb. 26, 1946 |
| 2,540,639 | Winther | Feb. 6, 1951 |

FOREIGN PATENTS

| Number | Country | Date |
|---|---|---|
| 141,492 | Great Britain | Apr. 22, 1920 |
| 940,358 | France | Dec. 10, 1943 |